US010986963B1

(12) United States Patent
Simpson

(10) Patent No.: US 10,986,963 B1
(45) Date of Patent: *Apr. 27, 2021

(54) BARBECUE COOKING APPARATUS

(71) Applicant: Robert Simpson, Pine Grove, CA (US)

(72) Inventor: Robert Simpson, Pine Grove, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/138,631

(22) Filed: Dec. 30, 2020

Related U.S. Application Data

(63) Continuation-in-part of application No. 29/764,316, filed on Dec. 29, 2020, and a continuation-in-part of application No. 16/386,066, filed on Apr. 19, 2019, now Pat. No. 10,905,283.

(60) Provisional application No. 62/658,280, filed on Apr. 16, 2018.

(51) Int. Cl.
| | |
|---|---|
| *A47J 37/07* | (2006.01) |
| *A47J 36/06* | (2006.01) |
| *A23B 4/052* | (2006.01) |
| *B66D 1/26* | (2006.01) |
| *B66D 1/04* | (2006.01) |

(52) U.S. Cl.
CPC ........... *A47J 37/0786* (2013.01); *A23B 4/052* (2013.01); *A47J 36/06* (2013.01); *A47J 37/0704* (2013.01); *B66D 1/04* (2013.01); *B66D 1/26* (2013.01); *A23V 2002/00* (2013.01); *A47J 2037/0795* (2013.01); *A47J 2202/00* (2013.01)

(58) Field of Classification Search
CPC .... A47J 37/0786; A47J 37/0704; A47J 36/06; A47J 2037/0786; B66D 1/26
See application file for complete search history.

(56) References Cited

U.S. PATENT DOCUMENTS

| | | | | |
|---|---|---|---|---|
| 3,052,441 | A * | 9/1962 | Fleischman | B62B 3/104 248/141 |
| 4,257,493 | A * | 3/1981 | Beckham | B66B 9/00 187/262 |
| 5,473,979 | A * | 12/1995 | Ruben | A47J 37/0704 99/446 |
| 7,140,362 | B1 * | 11/2006 | Johnston | A47J 37/049 126/25 A |
| 7,464,640 | B2 * | 12/2008 | Vasguez | A47J 37/1295 212/97 |
| 7,861,705 | B2 * | 1/2011 | Hulsey | A47J 37/07 126/25 A |

(Continued)

*Primary Examiner* — David J Laux
*Assistant Examiner* — Nikhil P Mashruwala

(57) ABSTRACT

A barbecue cooking apparatus is an apparatus used to cook food items by utilizing different barbecue smoking methods. The apparatus includes a barrel, a lid, a frame, a shelved cooking system, a venting system, a winch mechanism, a lip, and a firebox gasket. The barrel provides a thermal enclosure for cooking the food items. The lid serves to close the barrel and to support the shelved cooking system. The lip and the firebox gasket seal the lid on the barrel when closed. The shelved cooking system holds both the food items within the barrel during the cooking process and the fuel source utilized to generate the heat energy to cook the food items. The frame holds the winch mechanism offset from the barrel. The winch mechanism facilitates the retrieval of the shelved cooking system from the barrel as well as the reintroduction of the shelved cooking system into the barrel.

17 Claims, 16 Drawing Sheets

(56) References Cited

U.S. PATENT DOCUMENTS

| | | | | |
|---|---|---|---|---|
| 8,375,847 | B1 * | 2/2013 | Anganes | A47J 37/1219 |
| | | | | 99/407 |
| 9,402,508 | B2 * | 8/2016 | Cothern | A47J 37/07 |
| D813,589 | S * | 3/2018 | Graves | D7/332 |
| 2001/0032639 | A1 * | 10/2001 | Leach | A47J 37/0772 |
| | | | | 126/29 |
| 2004/0123857 | A1 * | 7/2004 | Viraldo | A47J 37/0704 |
| | | | | 126/9 R |
| 2006/0027228 | A1 * | 2/2006 | Moss | A47J 37/0786 |
| | | | | 126/25 R |
| 2015/0157173 | A1 * | 6/2015 | Jepsen | A47J 37/0745 |
| | | | | 126/25 AA |

* cited by examiner

US 10,986,963 B1

BARBECUE COOKING APPARATUS

The current application is a continuation-in-part (CIP) application of a U.S. non-provisional application Ser. No. 16/386,066 filed on Apr. 16, 2019. The U.S. non-provisional application Ser. No. 16/386,066 claims a priority to a U.S. provisional application Ser. No. 62/658,280 filed on Apr. 16, 2018.

The current application is also a CIP application of a U.S. design application serial number 29/764,316 filed on Dec. 29, 2020.

FIELD OF THE INVENTION

The present invention generally relates to food cooking devices. More specifically, the present invention is a vertical-rise versatile barbecue smoking apparatus which can accept a wide variety of fuel sources.

BACKGROUND OF THE INVENTION

Barbecuing has become a favorite means of cooking meats and vegetables, especially during the summertime when people gather together outdoors to enjoy the warm weather and summer festivities. Barbecuing has become so ingrained in present society that individuals can expect to find a barbecue grill installed at almost every park, beach, or other similar outdoor locations. Barbecuing can be considered a serious hobby or art by many people, and there are a wide variety of barbecue apparatuses for a variety of barbecuing needs and styles. For instance, a popular choice among the serious barbecue enthusiasts is the barbecue smoker. Barbecue smokers resemble barbecue grills in most features but differentiate in key areas. For example, barbecue smokers better constrain and circulate the heat within the apparatus to slowly cook the food, whereas grills allow the food to be cooked only from beneath and allow heat to escape to the surroundings. Furthermore, barbecue smokers often only allow the food to be laid flat on its side like the way barbecue grills function; however, this is inefficient as a user would need to constantly flip the lid open to turn over the food which can unnecessarily prolong the cooking process. These barbecue smokers also do not allow for hanging the food vertically so that all sides of the food can be cooked evenly. On the other hand, there are some barbecue smokers that are vertically aligned and allow for the foods to be hung. However, these vertical barbecue smokers are not versatile in allowing for the foods to be hung on hooks or placed on a grill. Also, these vertical barbecue smokers often provide a side door which is not efficient for constraining and promoting the circulation of heat within the barbecue smoker.

An objective of the present invention is to provide a barbecue cooking apparatus that is versatile for all barbecue smoking needs. The present invention provides a barbecue cooking apparatus which more efficiently cooks food items by reducing the amount of heat escaping from the apparatus. The present invention further provides users a versatile barbecue smoker that allows users to cook food items by either hanging the foods or by laying the food items down on a grill, or both. Another objective of the present invention is to provide a vertical barbecue cooking apparatus which can raise and lower the food items along the apparatus in a controlled manner so that food items can be cooked more efficiently without losing too much heat. The present invention further provides users with a barbecue cooking apparatus that is easy to transport, store, maintain, and clean.

DETAILED DESCRIPTION OF THE INVENTION

All illustrations of the drawings are for the purpose of describing selected versions of the present invention and are not intended to limit the scope of the present invention.

Figure 1:
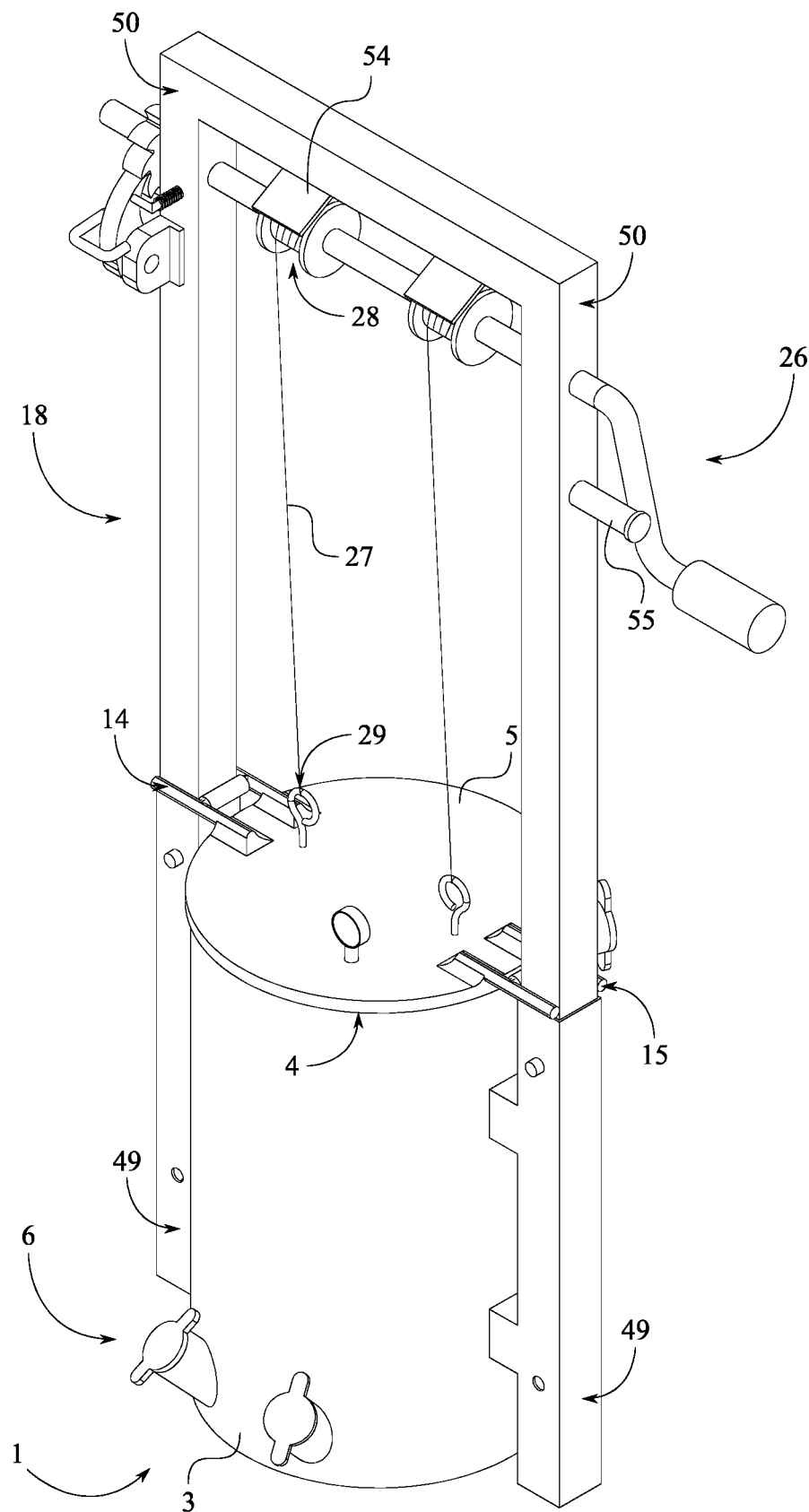
FIG. 1 is a top front perspective view of the present invention.
Figure 5:
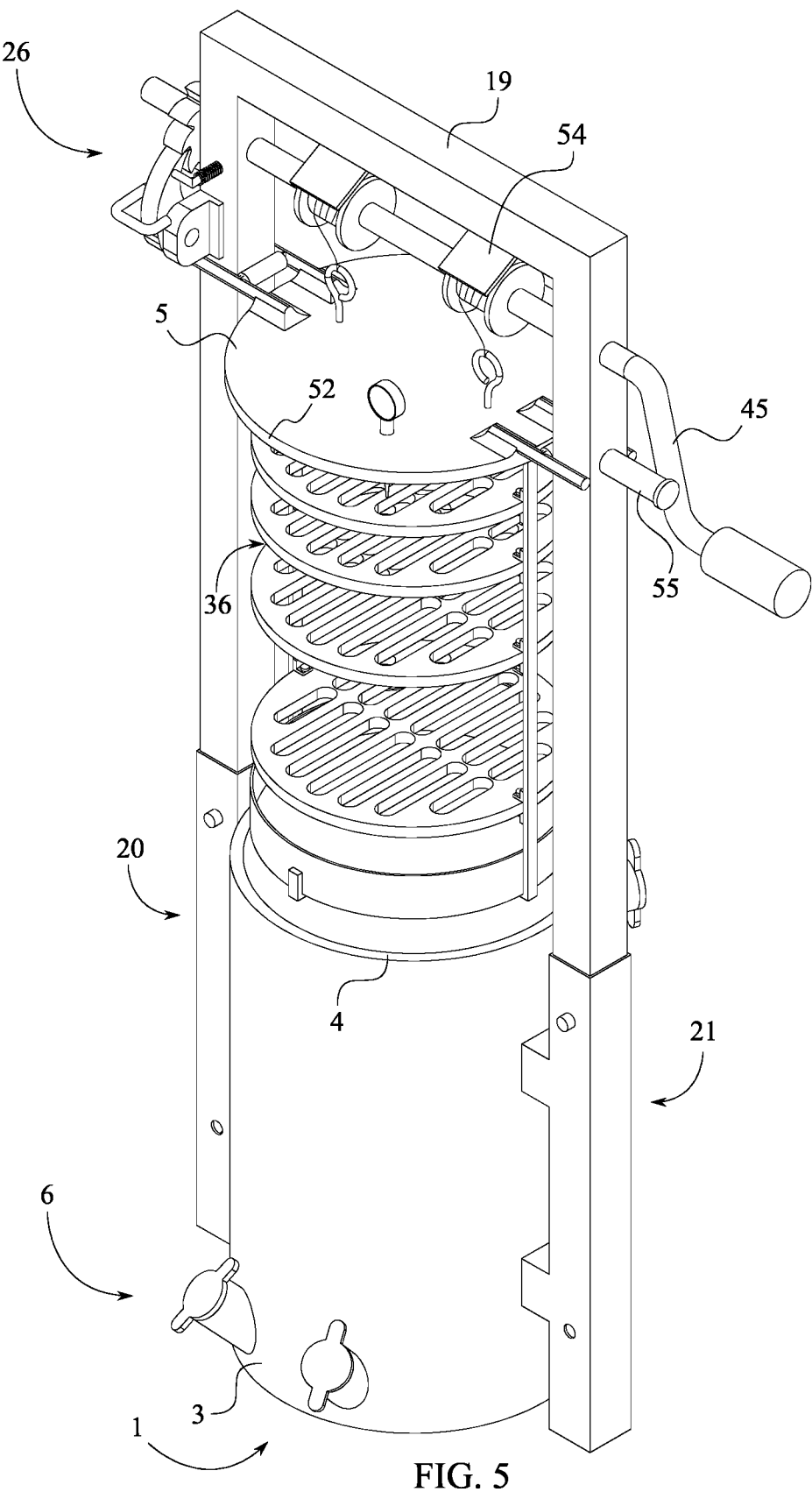
FIG. 5 is a top front perspective view of the present invention with the shelved cooking system retrieved from the barrel.
Figure 6:
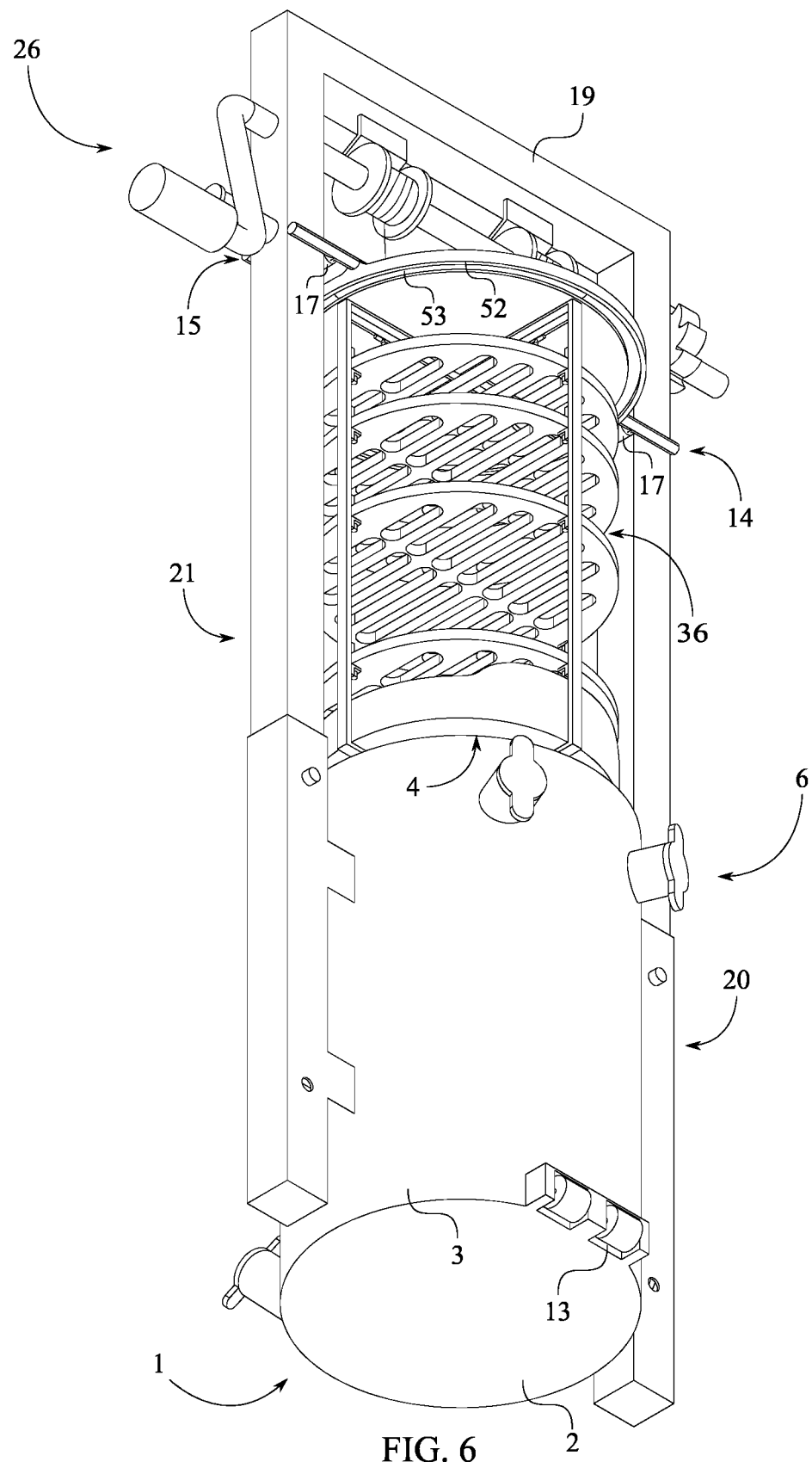
FIG. 6 is a bottom rear perspective view of the present invention with the shelved cooking system retrieved from the barrel.

As can be seen in FIGS. 1, 5, and 6, the present invention is a barbecue cooking apparatus. The barbecue cooking apparatus enables users to cook food items by utilizing different barbecue smoking methods. A preferred embodiment of the present invention comprises a barrel 1, a lid 5, a frame 18, a shelved cooking system 36, a venting system 6, a winch mechanism 26, a lip 52, and a firebox gasket 53. The barrel 1 comprises a base 2, a lateral wall 3, and a rim 4. The barrel 1 provides a thermal enclosure for cooking the food items. The lid 5 serves to close the barrel 1 and to support the shelved cooking system 36. The lip 52 and the firebox gasket 53 serve to seal the lid 5 on the barrel 1 during the cooking process. The shelved cooking system 36 holds the food items within the barrel 1 during the cooking process in a desired orientation. The shelved cooking system 36 further holds the fuel source utilized to generate the heat energy to cook the food items. The frame 18 serves to hold the winch mechanism 26 offset from the rim 4. The winch mechanism 26 facilitates the retrieval of the shelved cooking system 36 from the barrel 1 as well as the reintroduction of the shelved cooking system 36 into the barrel 1 as desired.

Figure 2:
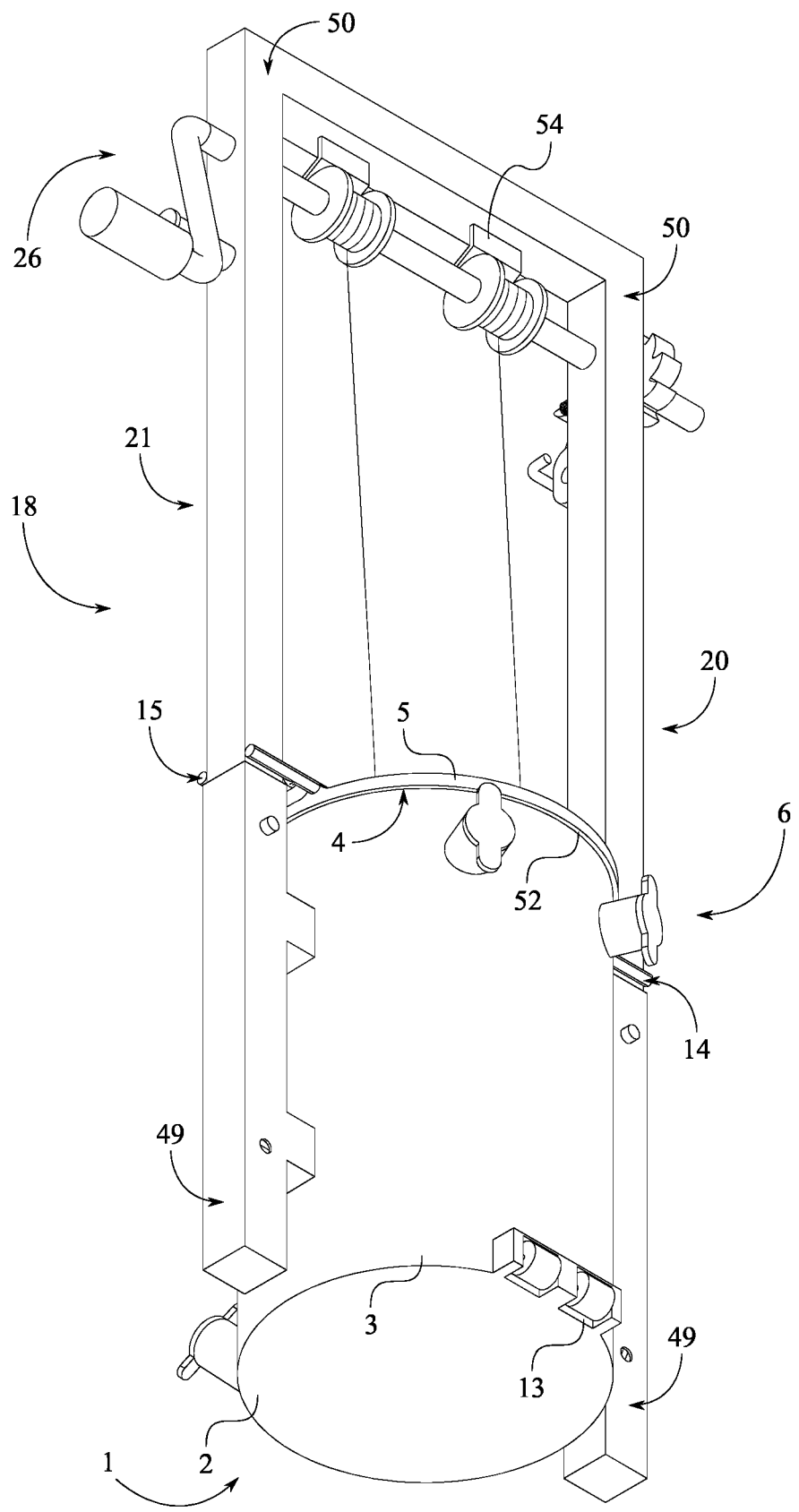
FIG. 2 is a bottom rear perspective view of the present invention.
Figure 7:
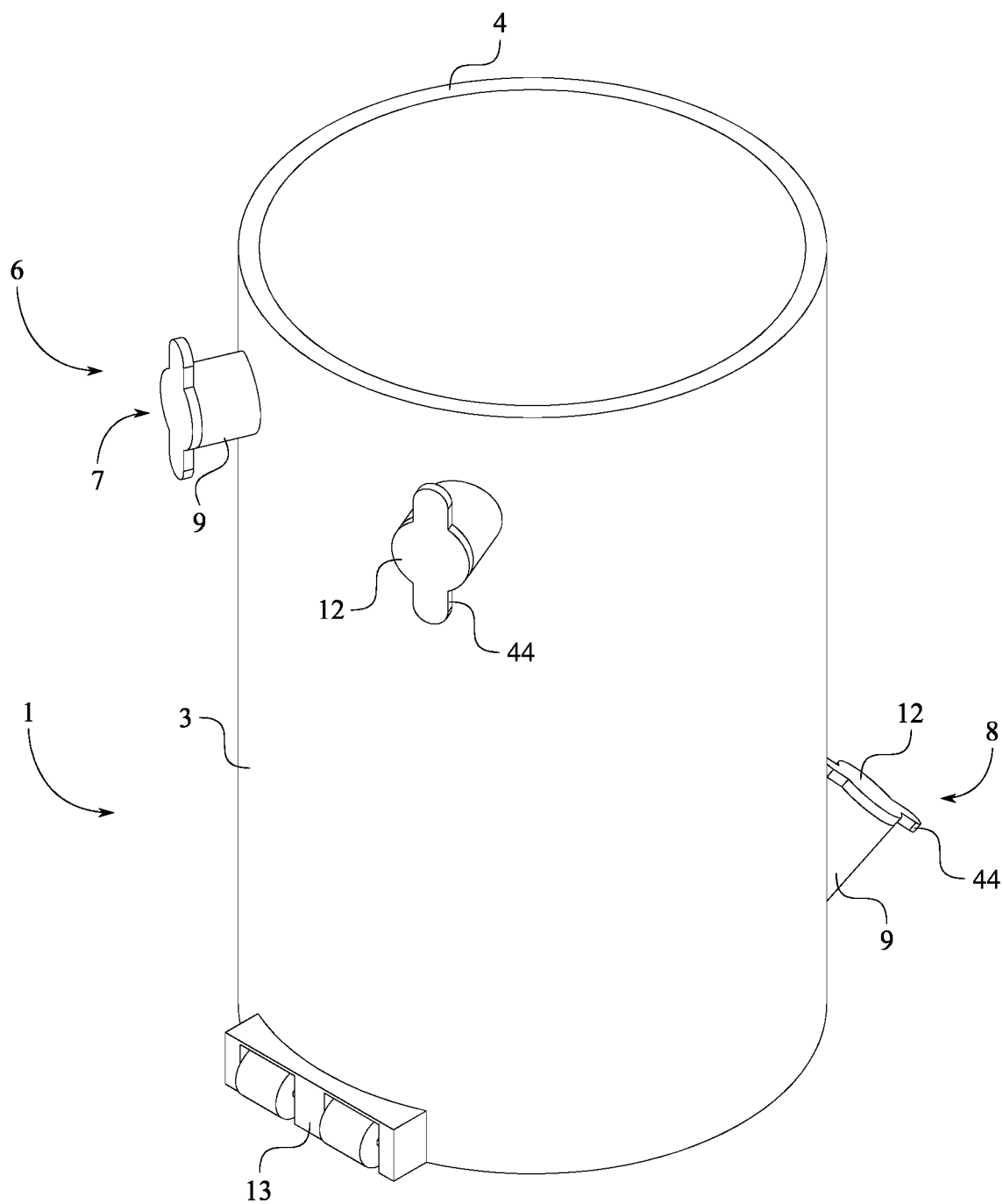
FIG. 7 is a top rear perspective view of the barrel and the venting system of the present invention.
Figure 8:
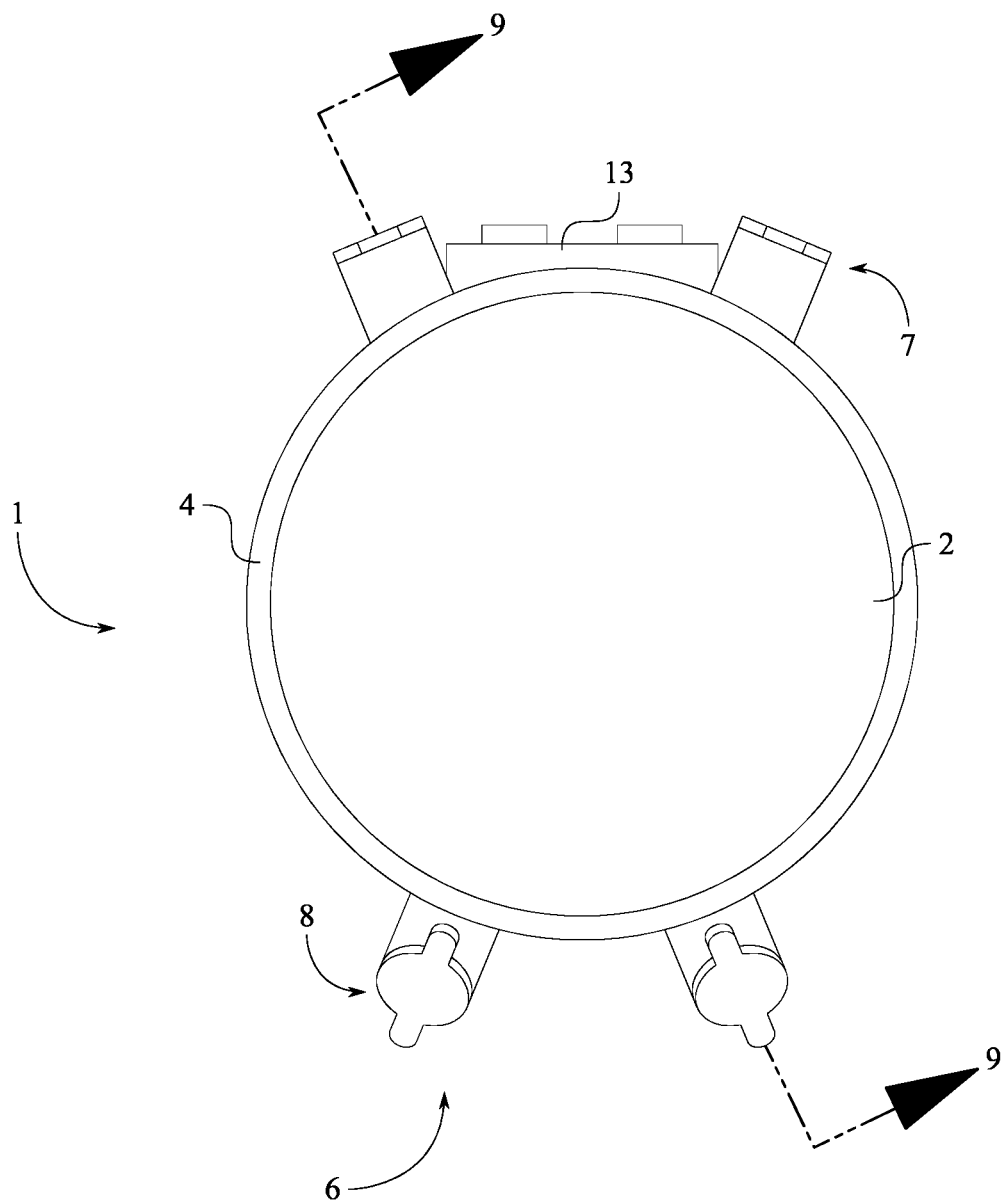
FIG. 8 is a top plan view of the barrel and the venting system of the present invention.
Figure 9:
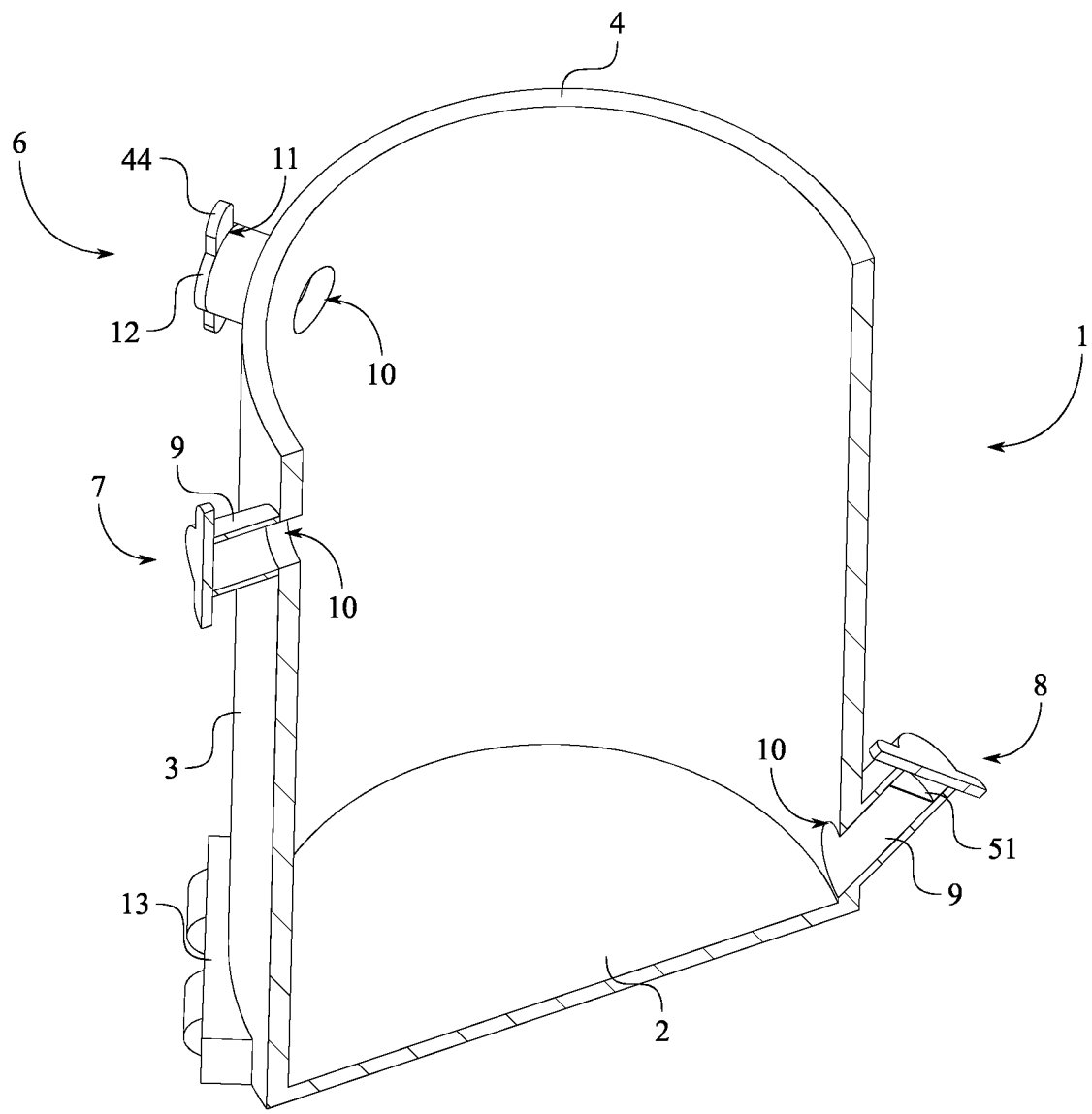
FIG. 9 is a vertical cross-sectional perspective view of the barrel and the venting system of the present invention taken along line 9-9 in FIG. 8.

The general configuration of the aforementioned components allows the present invention to cook food items utilizing different barbecue smoking methods. As can be seen in FIGS. 1 and 2, the frame 18 is externally mounted to the lateral wall 3 to support the winch mechanism 26 above the barrel 1. The winch mechanism 26 is mounted offset from the rim 4 by the frame 18 to facilitate the vertical movement of the lid 5 along the frame 18. In addition, the winch mechanism 26 is tethered to the lid 5 to convert the torsional movement of the winch mechanism 26 to the vertical movement of the lid 5 along the frame 18. As can be seen in FIGS. 1, 5, and 6, the lid 5 is slidably mounted along the frame 18 to prevent any non-vertical movement of the lid 5. The shelved cooking system 36 is mounted onto the lid 5 and positioned opposite the winch mechanism 26 to insert the food items into the barrel 1 for cooking. Further, the shelved cooking system 36 is configured to traverse into the barrel 1 to promote even cooking of the food items supported by the shelved cooking system 36. The venting system 6 is integrated into the lateral wall 3 to promote air flow within the barrel 1. The lip 52 is perimetrically connected to the lid 5 so that the lip 52 is positioned on the outer edge of the lid 5, matching the position of the rim 4. The firebox gasket 53 is attached onto the lip 52, opposite to the winch mechanism 26 so that firebox gasket 53 is pressed against the rim 4 when the barrel 1 is closed with the lid 5. In some embodiments of the present invention, the barrel 1 and lid 5 of the present invention are preferably made from durable, rigid, weather-proof, impact resistant materials which can resist a varied range of temperatures and pressures. As can be seen in FIG. 7 through 9, the barrel 1 further preferably comprises a thin-walled cylindrical design with the height being longer than the outer diameter of the barrel 1. Alternatively, the barrel 1 can comprise non-cylindrical designs with different sizes.

The frame 18 enables the integration of the winch mechanism 26 to facilitate the placement of food items prior to cooking on the shelved cooking system 36 as well as the removal of food items after the cooking process is finished. As can be seen in FIGS. 1 and 2, the frame 18 comprises a first length-adjustable rail 20 and a second length-adjustable rail 21. The first length-adjustable rail 20 and the second length-adjustable rail 21 are mounted onto the lateral wall 3 to form a single unit. The first length-adjustable rail 20 and the second length-adjustable rail 21 are also positioned parallel to each other. Further, the first length-adjustable rail 20 and the second length-adjustable rail 21 are positioned opposite each other about the lateral wall 3. Thus, the first length-adjustable rail 20 and the second length-adjustable rail 21 safely and securely support the winch mechanism 26 and the load carried by the winch mechanism 26. The first length-adjustable rail 20 and the second length-adjustable rail 21 are preferably made from the same material as the barrel 1.

As can be seen in FIGS. 1 and 2, the first length-adjustable rail 20 and the second length-adjustable rail 21 extend past the rim 4 to support the winch mechanism 26 that is offset from the rim 4. The first length-adjustable rail 20 and the second length-adjustable rail 21 each comprises a lower rail end 49 and an upper rail end 50. As can be seen in FIG. 2, the lower rail end 49 is positioned adjacent to the base 2 to align the lower rail end 49 with the base 2. The upper rail end 50 is positioned offset from the rim 4 to extend the first length-adjustable rail 20 and the second length-adjustable rail 21 past the rim 4. A height of the first length-adjustable rail 20 and the second length-adjustable rail 21 are preferably equal to double the height of the barrel 1. A width of the first length-adjustable rail 20 and the second length-adjustable rail 21 are preferably smaller than the width of the barrel 1.

Figure 3:
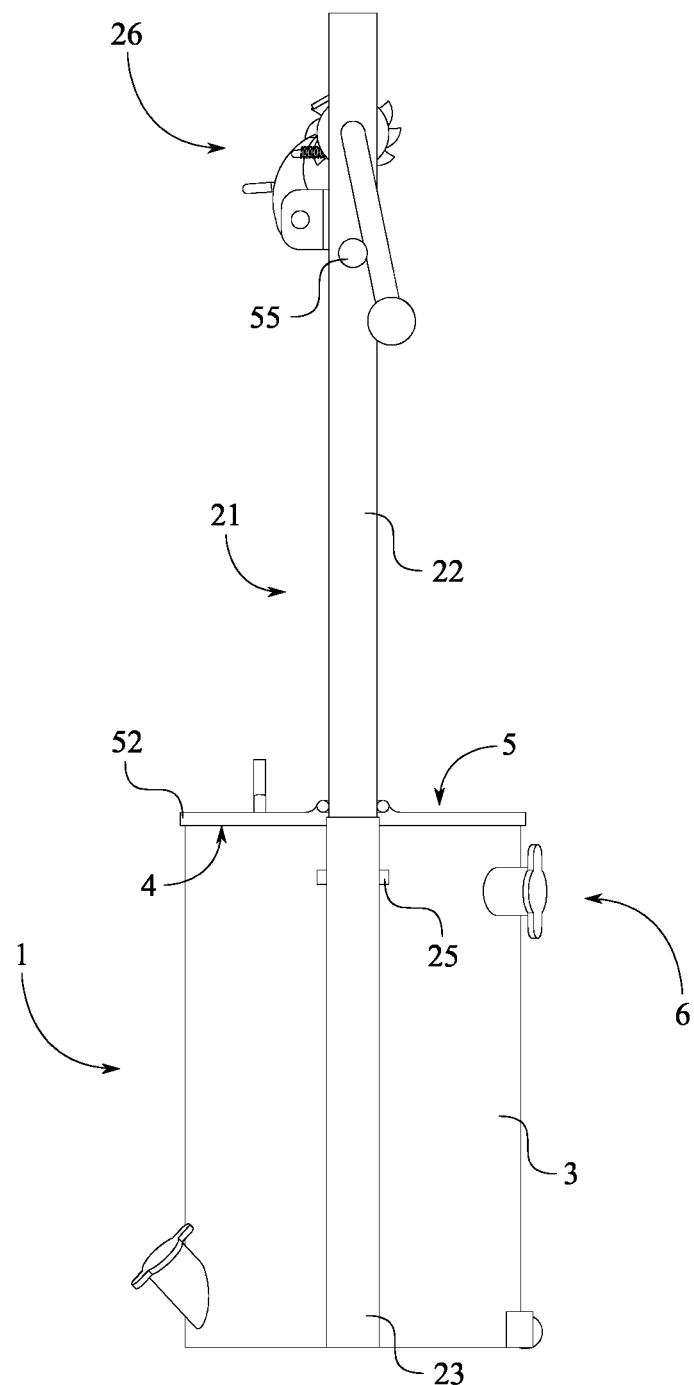
FIG. 3 is a left elevated view of the present invention in an expanded configuration.
Figure 4:
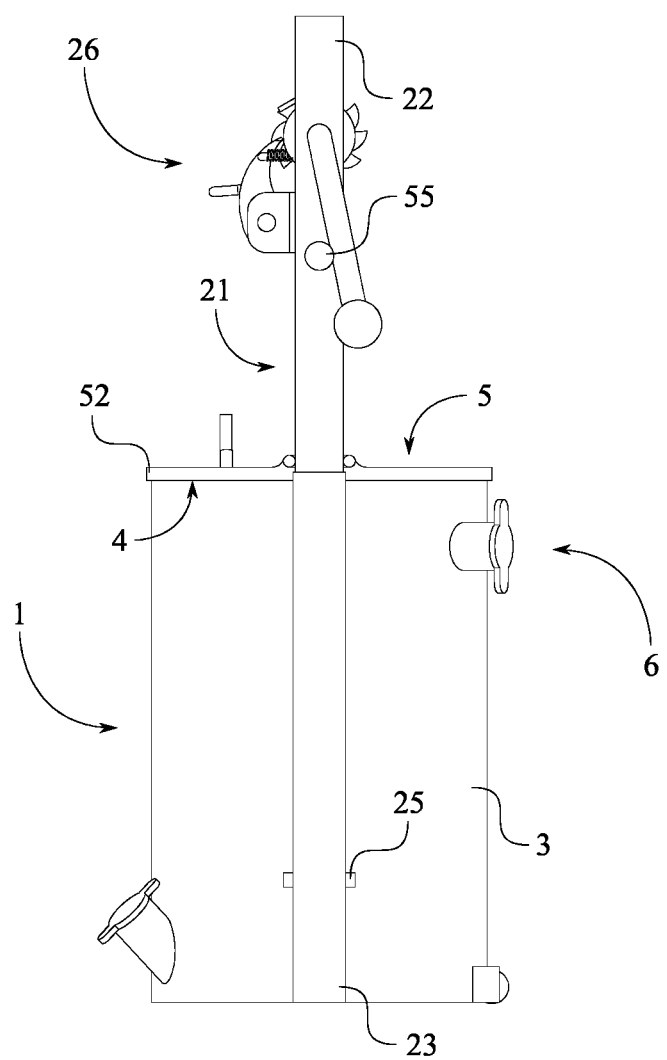
FIG. 4 is a left elevated view of the present invention in a contracted configuration.
Figure 10:
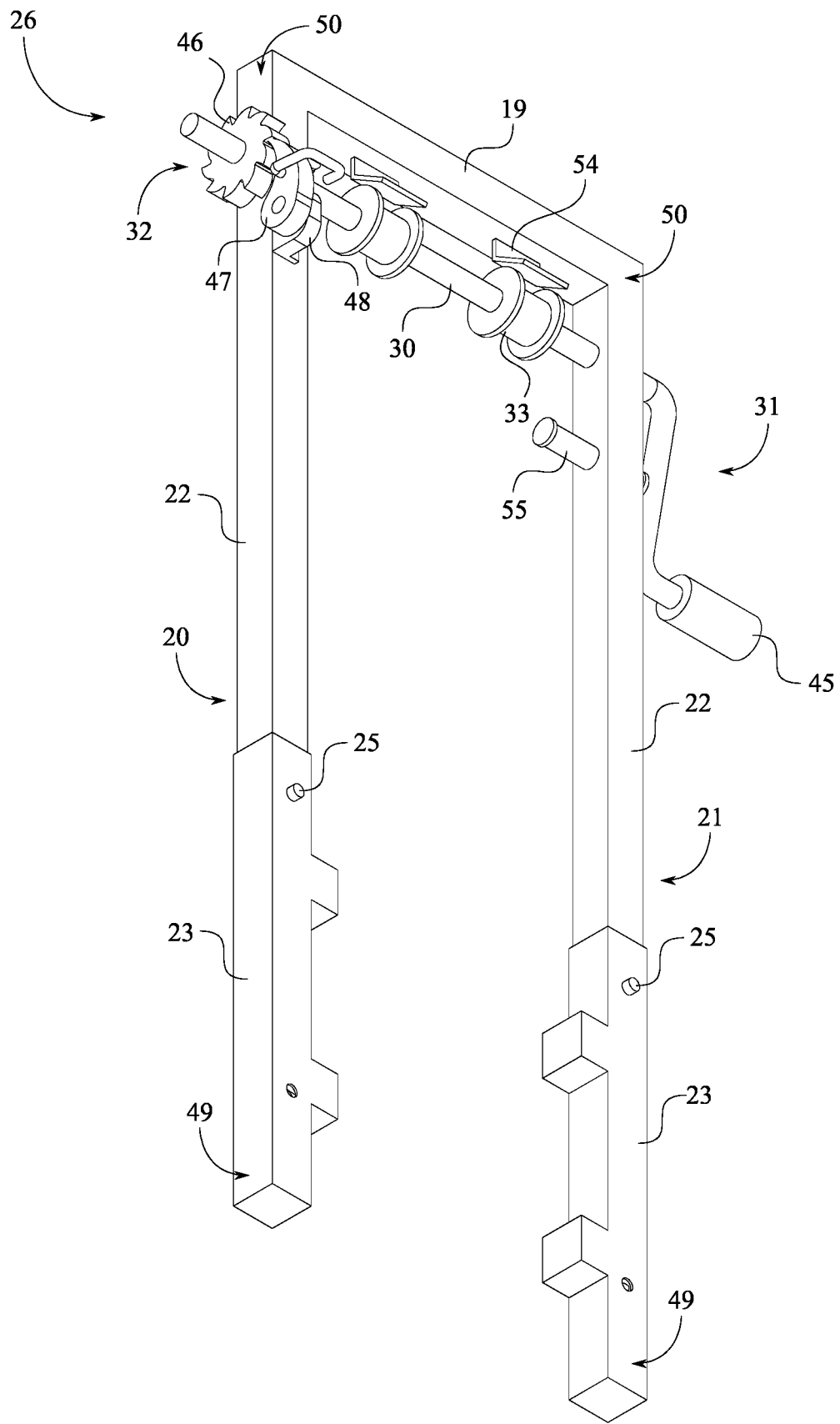
FIG. 10 is a bottom front perspective view of the frame and the winch mechanism of the present invention.
Figure 11:
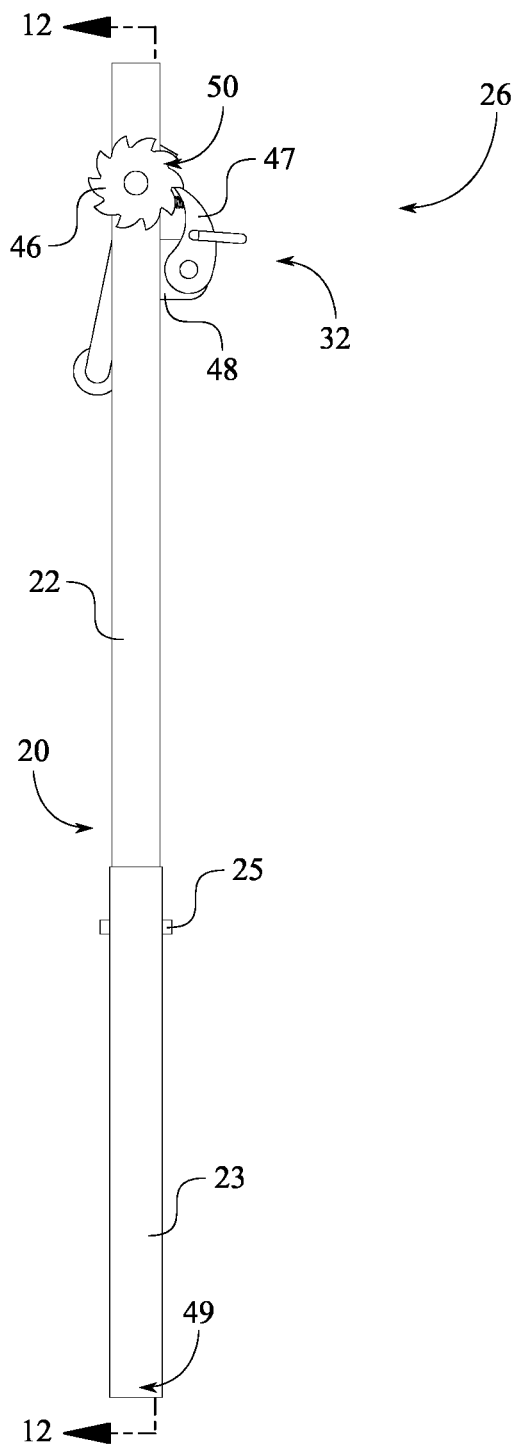
FIG. 11 is a right elevated view of the frame and the winch mechanism of the present invention.
Figure 12:
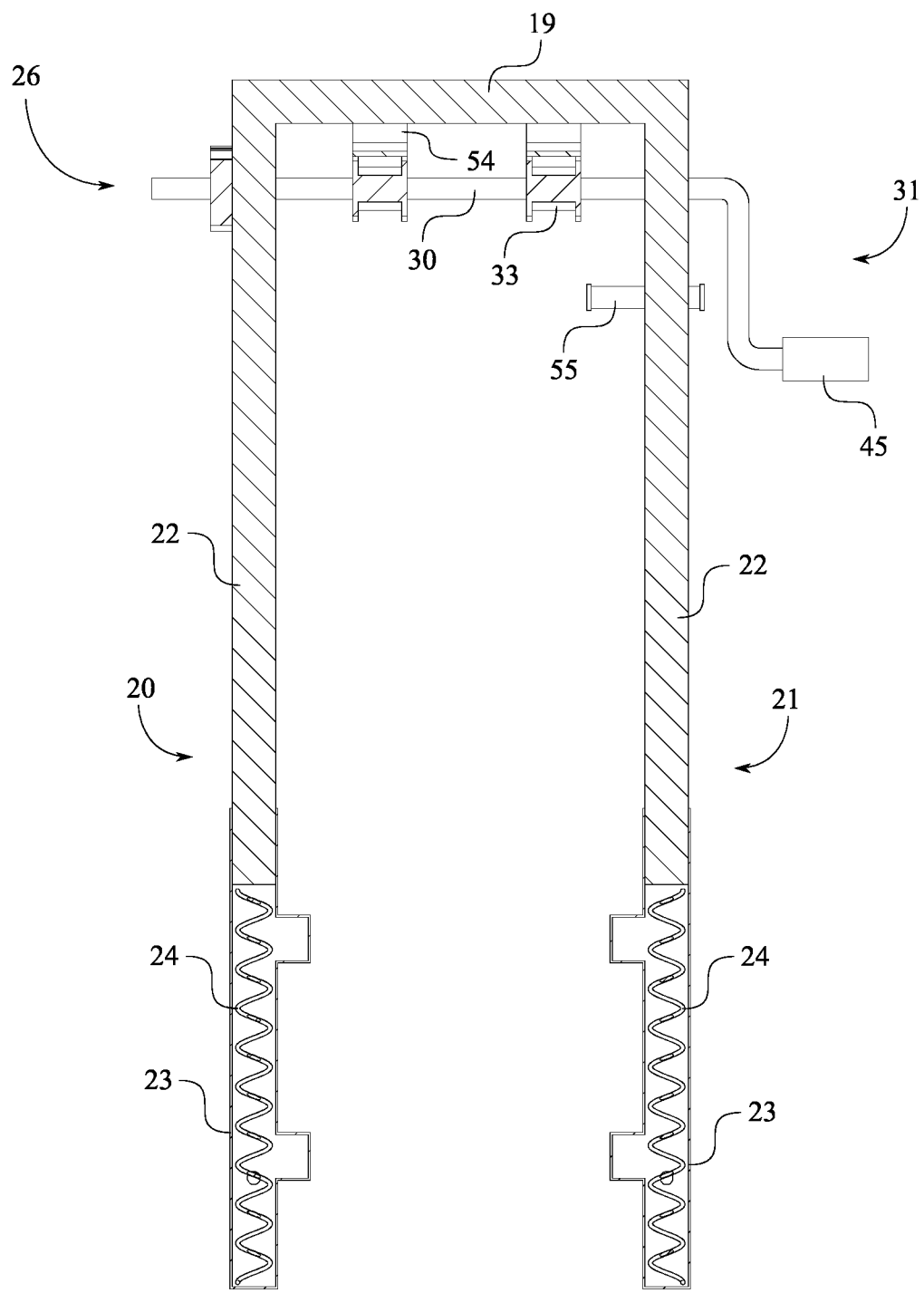
FIG. 12 is a vertical cross-sectional elevated view of the frame and the winch mechanism of the present invention taken along line 12-12 in FIG. 11.

As can be seen in FIGS. 3 and 4, some embodiments of the first length-adjustable rail 20 and the second length-adjustable rail 21 comprise telescopic mechanisms of length adjustment. As can be seen in FIG. 10 through 12, the first length-adjustable rail 20 and the second length-adjustable rail 21 each comprises an upper pole 22, a lower pole 23, a spring mechanism 24, and a locking mechanism 25. The lower pole 23 is mounted parallel to the lateral wall 3 to mount the length-adjustable rail to the barrel 1. The upper pole 22 is telescopically engaged to the lower pole 23 to enable the overlapping sliding of the upper pole 22 along the lower pole 23. The spring mechanism 24 is operatively coupled between the lower pole 23 and the upper pole 22, wherein the spring mechanism 24 is used to apply a continuous force to push the upper pole 22 away from the lower pole 23. The locking mechanism 25 is operatively integrated between the lower pole 23 and the upper pole 22, wherein the locking mechanism 25 is used to lock the upper pole 22 in place along the lower pole 23. Some embodiments of the locking mechanism 25 comprise a locking-pin system to enable the manual locking of the desired position of the upper pole 22 along lower pole 23. In some embodiments of the present invention, the first length-adjustable rail 20 and the second length-adjustable rail 21 may each comprises mechanical engagement of length adjustment which enables the automatic adjustment of the desired working lengths of the first length-adjustable rail 20 and the second length-adjustable rail 21.

Some embodiments of the frame 18 comprise additional reinforcement. As can be seen in FIGS. 10 and 12, the frame 18 further comprises a crossbar 19. The crossbar 19 is perpendicularly connected between the first length-adjustable rail 20 and the second length-adjustable rail 21 to reinforce the frame 18. The crossbar 19 is further positioned adjacent to the winch mechanism 26 to reinforce the mounting of the winch mechanism 26 to the frame 18.

The winch mechanism 26 facilitates the vertical sliding of the lid 5 along the frame 18. The winch mechanism 26 comprises at least one hoisting cable 27, a main axle 30, a crank mechanism 31, a ratcheting mechanism 32, and at least one spool 33. The at least one hoisting cable 27 further comprises a first cable end 28 and a second cable end 29. As can be seen in FIG. 10 through 12, the main axle 30 is rotatably connected between the first length-adjustable rail 20 and the second length-adjustable rail 21 to enable the rotation of the at least one spool 33. The crank mechanism 31 is torsionally connected to the main axle 30 to transfer torsional forces from the crank mechanism 31 to the main axle 30. The at least one spool 33 is laterally connected around the main axle 30 to simultaneously rotate with the main axle 30. As can be seen in FIG. 1, the first cable end 28 is laterally connected to the at least one spool 33 to enable the winding of the at least one hoisting cable 27 onto the at least one spool 33. The second cable end 29 is connected onto the lid 5 to enable the hoisting of the lid 5. As can be seen in FIG. 10 through 12, the ratcheting mechanism 32 is operatively integrated between the frame 18 and the main axle 30, wherein the ratcheting mechanism 32 is used to selectively allow rotation of the main axle 30 in one direction and to selectively prevent rotation of the main axle 30 in an opposite direction. As can be seen in FIG. 10 through 12, some embodiments of the ratcheting mechanism 32 comprise a ratchet wheel 46, a pawl 47, and a mounting bracket 48. The ratchet wheel 46 is rotatably connected to the main axle 30. The mounting bracket 48 is mounted to the frame 18 adjacent to the ratchet wheel 46 to hold and support the pawl 47. The pawl 47 is pivotally connected to the mounting bracket 48 to engage with the ratchet wheel 46 to impart forward rotation of the ratchet wheel 46 or prevent backward rotation of the ratchet wheel 46. Further, some embodiments of the crank mechanism 31 comprises a crank handle 45. As can be seen in FIG. 10, the crank handle 45 is rotatably connected to the main axle 30, opposite the ratchet wheel 46 and along the main axle 30 to allow manual operation of the winch mechanism 26. In some embodiments of the present invention, the winch mechanism 26 may comprise motorized systems of operation to allow automatic operation of the winch mechanism 26.

To prevent the at least one hoisting cable 27 from derailing, the present invention further comprises at least one cable deflector 54. As can be seen in FIGS. 1 and 2, the at least one cable deflector 54 is mounted onto the frame 18 so the frame 18 supports the at least one cable deflector 54. The at least one cable deflector 54 is positioned adjacent to the at least one spool 33 to guide the recoiling at least one hoisting cable 27 back onto the at least one spool 33. Further, the at least one hoisting cable 27 is operatively coupled to the at least one cable deflector 54, wherein the at least one cable deflector 54 is used to guide the at least one hoisting cable 27 onto and off the at least one spool 33. For example, the at least one cable deflector 54 is positioned above the at least one spool 33 so that the at least one hoisting cable 27 does not move past the at least one spool 33, as can be seen in FIGS. 1 and 5. Thus, when the at least one hoisting cable 27 is being recoiled or the frame 18 is collapsed, the at least one hoisting cable 27 will not move past the at least one spool 33.

In addition, to prevent harm to the user due to the failure of the ratcheting mechanism 32 or accidental moving of the crank handle 45, the present invention further comprises a deadbolt mechanism 55. As can be seen in FIGS. 1 and 2, the crank mechanism 31 is a crank handle 45 which is manually operated. The crank handle 45 is laterally positioned to the frame 18 to not obstruct with the operation of the winch mechanism 26. Likewise, the deadbolt mechanism 55 is integrated into the frame 18 so the deadbolt mechanism 55 can be deployed towards the crank handle 45. Further, the deadbolt mechanism 55 is positioned adjacent to the crank handle 45. Thus, when the deadbolt mechanism 55 is deployed, the deadbolt mechanism 55 will prevent the rotation of the crank handle 45.

Figure 13:
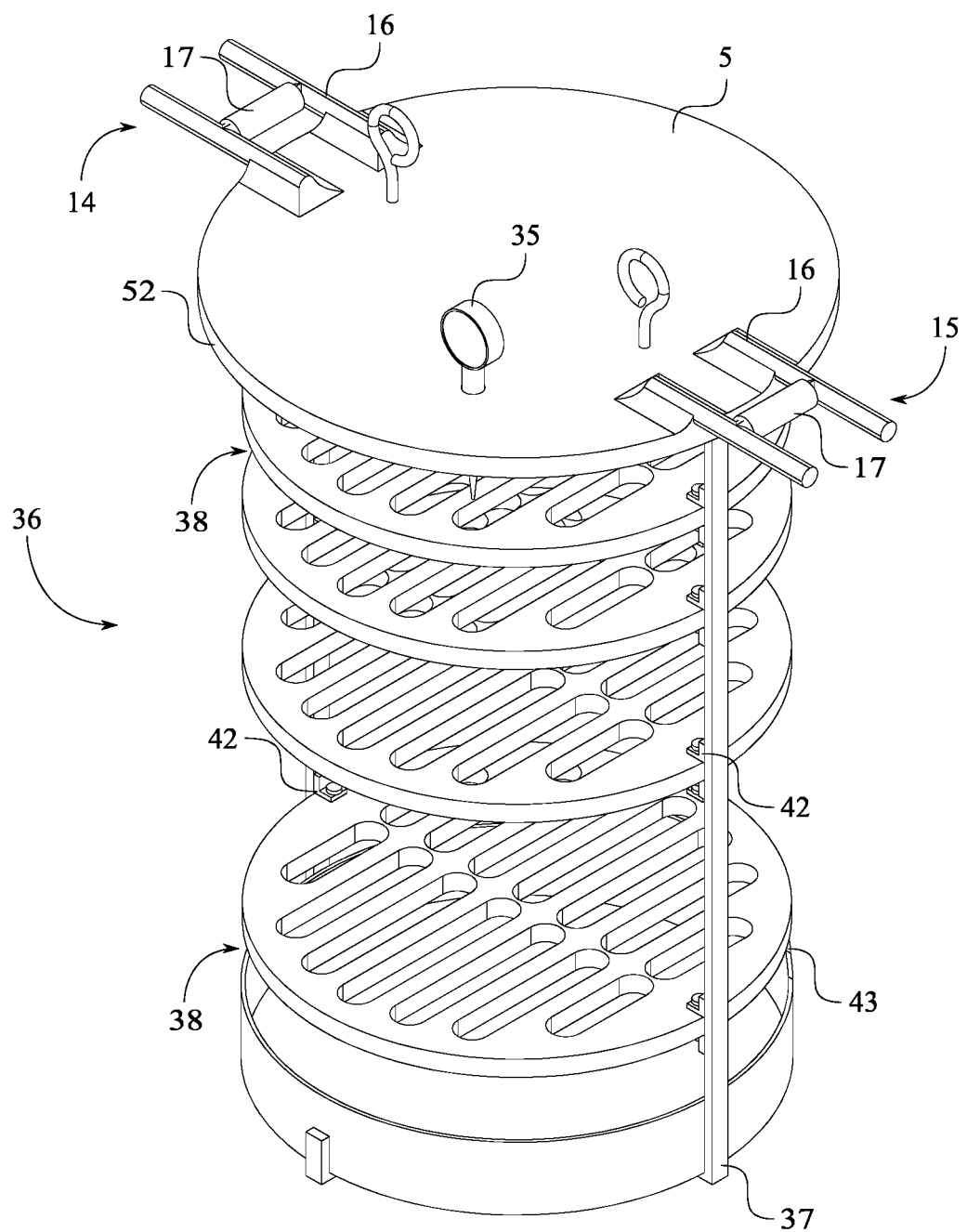
FIG. 13 is a top front perspective view of the lid and the shelved cooking system of the present invention.
Figure 14:
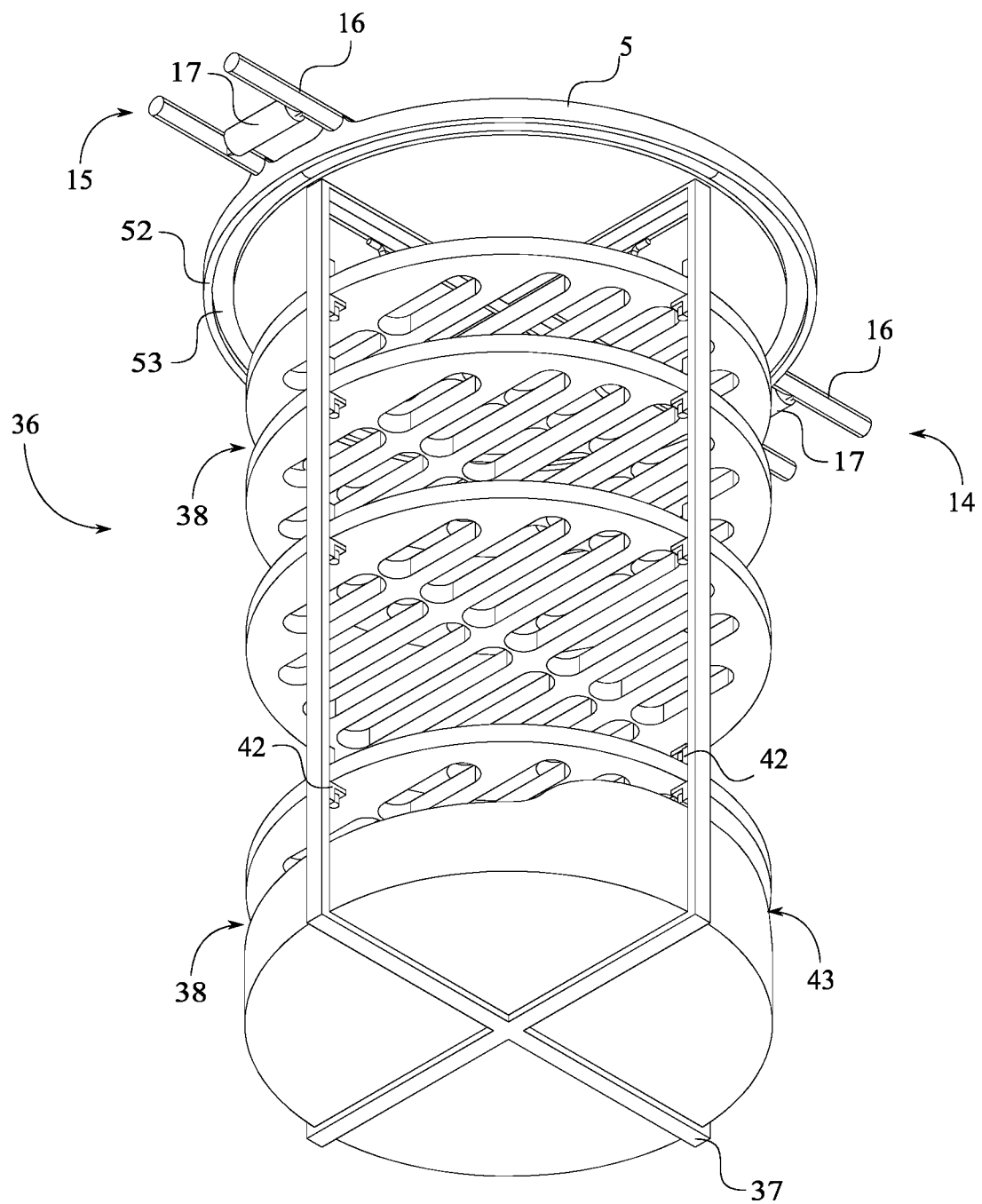
FIG. 14 is a bottom rear perspective view of the lid and the shelved cooking system of the present invention.

The shelved cooking system 36 enables the cooking of food items utilizing different barbecue smoking methods. As can be seen in FIGS. 13 and 14, the shelved cooking system 36 comprises at least one support member 37, a plurality of cooking shelves 38, and a plurality of releasable pin locks 42. The at least one support member 37 is connected normal to the lid 5 to introduce the plurality of cooking shelves 38 into barrel 1. The at least one support member 37 preferably comprises a bracket-like design with specialized areas to support the plurality of cooking shelves 38. Each of the plurality of cooking shelves 38 is attached to the at least one support member 37 by a corresponding lock from the plurality of releasable pin locks 42. The plurality of cooking shelves 38 is positioned normal to the at least one support member 37 to prevent food items placed on the plurality of cooking shelves 38 from falling off. Further, the plurality of cooking shelves 38 is distributed along the at least one support member 37 to maintain a space between the food items placed on the plurality of cooking shelves 38. Some embodiments of the at least one support member 37 comprises multiple support members, preferably three support members, arranged in a cross-like arrangement to form a rack-like support structure.

Figure 15:
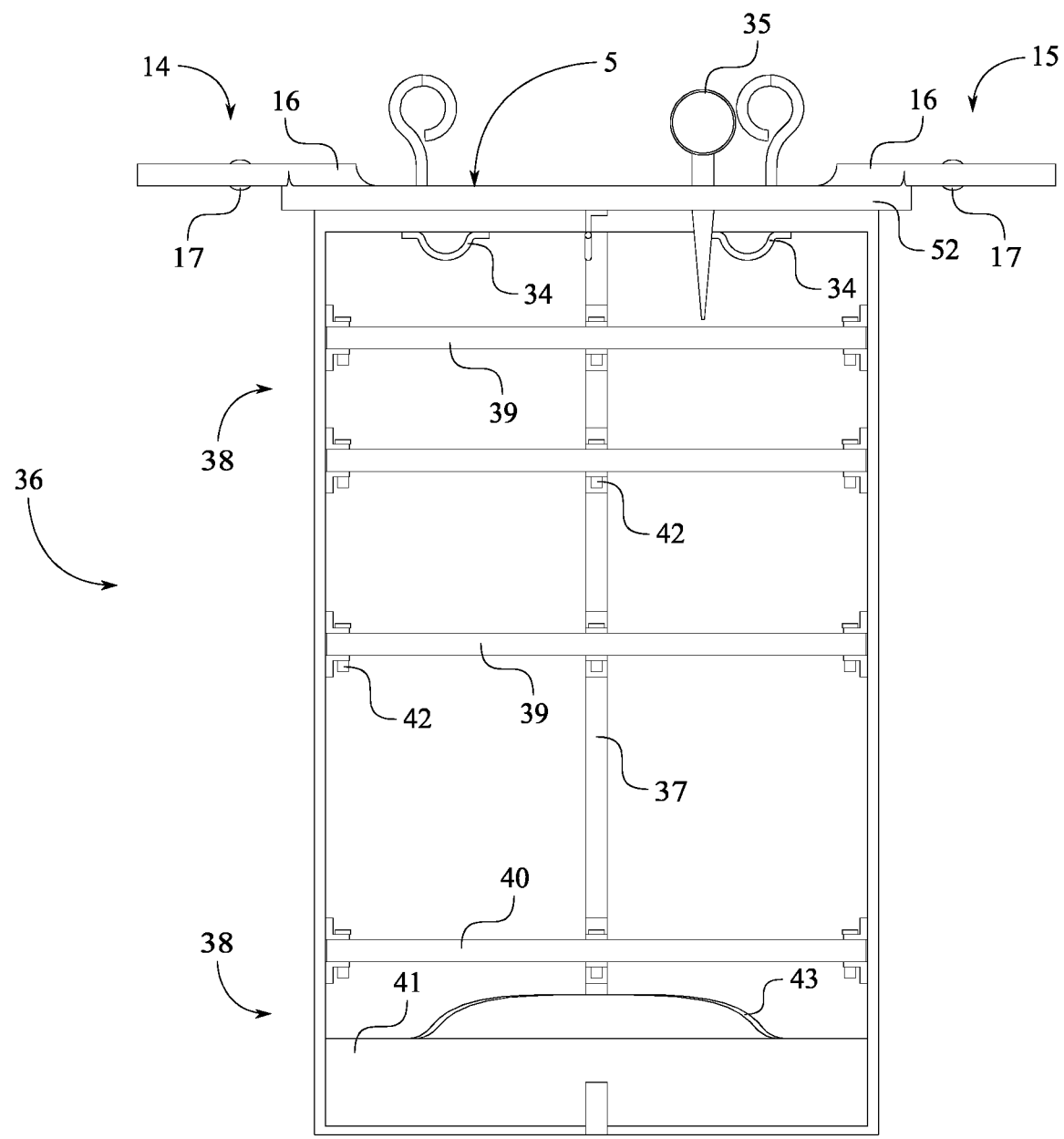
FIG. 15 is a front elevated view of the lid and the shelved cooking system of the present invention.
Figure 16:
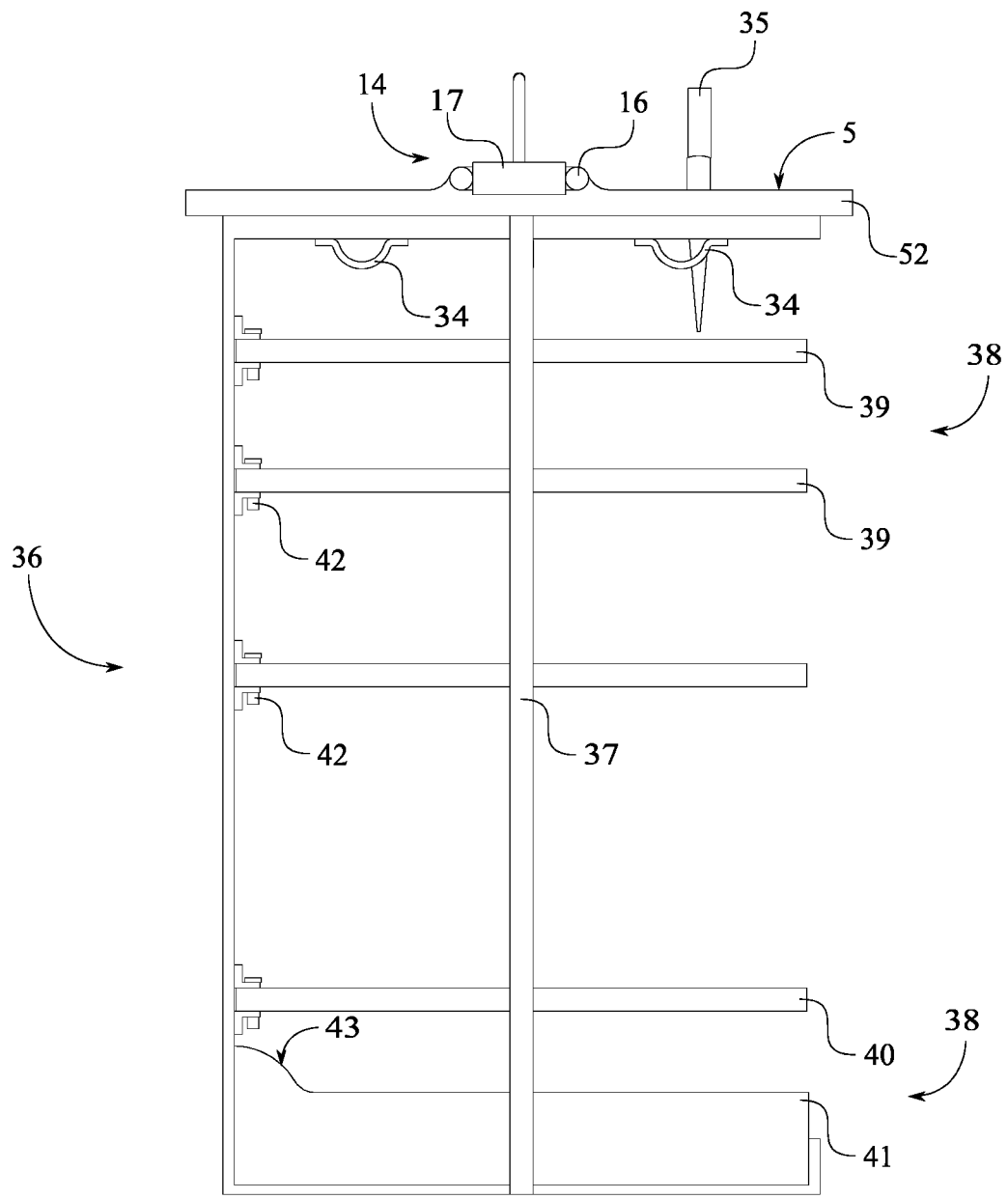
FIG. 16 is a right elevated view of the lid and the shelved cooking system of the present invention.

Some embodiments of the plurality of cooking shelves 38 comprise different shelves adapted to receive various food items or fuel sources. As can be seen in FIGS. 15 and 16, the plurality of cooking shelves 38 comprises a plurality of racks 39, at least one catching tray 40, and at least one fuel-retaining tray 41. The at least one fuel-retaining tray 41 is positioned offset from the lid 5 to create a cooking area between the lid 5 and the at least one fuel-retaining tray 41. The at least one fuel-retaining tray 41 is adapted to support various fuel sources including, but not limited to, solid fuel sources such as charcoal or wood. Furthermore, the barrel 1 can be adapted to operate with alternate fuel sources. In some embodiments of the present invention, the at least one fuel-retaining tray 41 is releasably mounted onto the at least one support member 37 without the use of the plurality of releasable pin locks 42. The plurality of racks 39 is positioned in between the lid 5 and the at least one fuel-retaining tray 41 to separate the food items placed on the plurality of racks 39 from the fuel sources placed on the fuel-retaining tray 41. The at least one catching tray 40 is positioned in between the plurality of racks 39 and the at least one fuel-retaining tray 41 to prevent food waste from the food items placed on the plurality of racks 39 from falling to the at least one fuel-retaining tray 41. As can be seen in FIG. 15, some embodiments of the at least one fuel-retaining tray 41 comprise a raised ledge 43 to prevent fuel sources from falling off the at least one fuel-retaining tray 41 while the at least one fuel-retaining tray 41 is being transported. The raised ledge 43 is perimetrically integrated onto the rim 4 of the at least one fuel-retaining tray 41. The raised ledge 43 is preferably positioned adjacent the drive wheel assembly 13 so fuel sources on the at least one fuel-retaining tray 41 do not fall off onto the base 2 during transportation of the present invention.

The venting system 6 facilitates the air flow within the barrel 1 during the cooking process. As can be seen in FIG. 7 through 9, the venting system 6 comprises at least one intake vent 7 and at least one exhaust vent 8. The at least one intake vent 7 is integrated into the lateral wall 3 to enable air inflow into the barrel 1. The at least one exhaust vent 8 is integrated into the lateral wall 3, opposite the at least one intake vent 7 to enable air outflow out of the barrel 1. The at least one intake vent 7 and the at least one exhaust vent 8 are preferably made from the same material as the barrel 1. In some embodiments of the present invention, the at least one intake vent 7 comprises multiple intake vents distributed around the lateral wall 3. The at least one exhaust vent 8 comprises multiple exhaust vents distribute around the lateral wall 3, opposite the multiple intake vents. Furthermore, the at least one exhaust vent 8 is preferably non-perpendicularly integrated into the lateral wall 3.

Some embodiments of the at least one intake vent 7 and the at least one exhaust vent 8 comprise sealable mechanism to selectively enable air flow into and out of the barrel 1. As can be seen in FIG. 9, the at least one intake vent 7 and the at least one exhaust vent 8 each comprises a vent body 9 and a vent hatch 12. The vent body 9 further comprises a first open end 10 and a second open end 11. The first open end 10 is positioned adjacent to the lateral wall 3 to integrate the vent body 9 to the lateral wall 3. The second open end 11 is positioned offset from the lateral wall 3. The vent hatch 12 is attached onto the second open end 11 to enable the selective sealing of the vent body 9.

The vent body 9 preferably comprises a thin-walled cylindrical design. In some embodiments of the present invention, the vent hatch 12 is attached to the second open end 11 in a swing-like manner. The vent hatch 12 further comprises a hatch handle 44 that insulates the vent hatch 12 to prevent burns. In addition, the vent body 9 comprises a vent screen 51 which prevents debris or ash sparks generated by the consumption of the fuel source on the at least on fuel-retaining tray 41 from escaping the barrel 1. The vent screen 51 is integrated within the vent body 9, adjacent the second open end 11.

Some embodiments of the present invention comprise at least one transportation system. As can be seen in FIG. 7, the present invention further comprises a drive wheel assembly 13. The drive wheel assembly 13 is mounted onto the lateral wall 3. The drive wheel assembly 13 is further positioned adjacent to the base 2 in order to enable the transportation of the present invention when the present invention is in a tilted configuration and to prevent movement when the present invention is in a vertical configuration. In some embodiments of the present invention, the drive wheel assembly 13 is located centrally on the rear portion of the barrel 1.

Some embodiments of the present invention comprise a guiding assembly for the vertical movement of the lid 5 along the frame 18. As can be seen in FIGS. 1 and 2, the present invention further comprises a first rail guide 14 and a second rail guide 15. The first rail guide 14 and the second rail guide 15 is peripherally connected to the lid 5. Further, the first rail guide 14 and the second rail guide 15 is opposite each other across the lid 5. The first rail guide 14 is movably engaged along the first length-adjustable rail 20. Likewise, the second rail guide 15 is movably engaged along a second length-adjustable rail 21.

Some embodiments of the first rail guide 14 and the second rail guide 15 further comprise rolling means which facilitate the sliding movement of lid 5 along the frame 18. As can be seen in FIG. 13, the first rail guide 14 and the second rail guide 15 each comprises a guide body 16 and a guide roller 17. The guide body 16 is mounted onto the lid 5. Further, the guide roller 17 is rotatably mounted to the guide body 16 to reduce the friction between the frame 18 and the guide body 16. As can be seen in FIG. 6, the guide roller 17 of the first rail guide 14 is rollably engaged to the first length-adjustable rail 20 of the frame 18. The guide roller 17 of the second rail guide 15 is rollably engaged to the second length-adjustable rail 21 of the frame 18.

Some embodiments of the present invention further provide various fixtures adapted for specific barbecue smoking methods. As can be seen in FIGS. 15 and 16, the present invention comprises a plurality of food-hanging fixtures 34. The plurality of food-hanging fixtures 34 is connected to the lid 5, opposite the winch mechanism 26. In addition, the plurality of food-hanging fixtures 34 is distributed across the lid 5 to hang food items separate from each other.

Some embodiments of the present invention further provide a temperature gauging system to monitor different conditions within the barrel 1 during the cooking process. As can be seen in FIG. 13, the present invention comprises at least one temperature gauge 35. The at least one temperature gauge 35 is mounted onto the lid 5, opposite the shelved cooking system 36. Further, the at least one temperature gauge 35 is in thermal communication with the barrel 1 to monitor the temperature within the barrel 1 at various points during the cooking process.

Although the invention has been explained in relation to its preferred embodiment, it is to be understood that many other possible modifications and variations can be made without departing from the spirit and scope of the invention as hereinafter claimed.

What is claimed is:

1. A barbecue cooking apparatus comprising:
    a barrel;
    a lid;
    a frame;
    a shelved cooking system;
    a venting system;
    a winch mechanism;
    a lip;
    a firebox gasket;
    the barrel comprising a base, a lateral wall, and a rim;
    the frame being externally mounted to the lateral wall;
    the winch mechanism being mounted offset from the rim by the frame;
    the winch mechanism being tethered to the lid;
    the lid being slidably mounted along the frame;
    the shelved cooking system being mounted onto the lid, opposite the winch mechanism;
    the shelved cooking system being configured to traverse into the barrel;
    the venting system being integrated into the lateral wall;
    the lip being perimetrically connected to the lid; and
    the firebox gasket being attached onto the lip, opposite to the winch mechanism.

2. The barbecue cooking apparatus as claimed in claim 1 further comprising:
    the frame comprising a first length-adjustable rail and a second length-adjustable rail;
    the first length-adjustable rail and the second length-adjustable rail being mounted onto the lateral wall;
    the first length-adjustable rail and the second length-adjustable rail being positioned parallel to each other; and
    the first length-adjustable rail and the second length-adjustable rail being positioned opposite to each other about the lateral wall.

3. The barbecue cooking apparatus as claimed in claim 2 further comprising:
    the first length-adjustable rail and the second length-adjustable rail each comprising a lower rail end and an upper rail end;
    the lower rail end being positioned adjacent to the base; and
    the upper rail end being positioned offset from the rim.

4. The barbecue cooking apparatus as claimed in claim 2 further comprising:
    the first length-adjustable rail and the second length-adjustable rail each comprising an upper pole, a lower pole, a spring mechanism, and a locking mechanism;
    the lower pole being mounted parallel to the lateral wall;
    the upper pole being telescopically engaged to the lower pole;
    the spring mechanism being operatively coupled between the lower pole and the upper pole, wherein the spring mechanism is used to apply a continuous force to push the upper pole away from the lower pole; and
    locking mechanism being operatively integrated between the lower pole and the upper pole, wherein the locking mechanism is used to lock the upper pole in place along the lower pole.

5. The barbecue cooking apparatus as claimed in claim 2 further comprising:

the frame further comprising a crossbar;
the crossbar being perpendicularly connected between the first length-adjustable rail and the second length-adjustable rail; and,
the crossbar being positioned adjacent to the winch mechanism.

6. The barbecue cooking apparatus as claimed in claim 1 further comprising:
the winch mechanism comprising at least one hoisting cable, a main axle, a crank mechanism, a ratcheting mechanism, and at least one spool;
the at least one hoisting cable comprising a first cable end and a second cable end;
the main axle being rotatably connected between a first length-adjustable rail of the frame and a second length-adjustable rail of the frame;
the crank mechanism being torsionally connected to the main axle;
the at least one spool being laterally connected around the main axle;
the first cable end being laterally connected to the at least one spool;
the second cable end being connected onto the lid; and
the ratcheting mechanism being operatively integrated between the frame and the main axle, wherein the ratcheting mechanism is used to selectively allow rotation of the main axle in one direction and to selectively prevent rotation of the main axle in an opposite direction.

7. The barbecue cooking apparatus as claimed in claim 6 further comprising:
at least one cable deflector;
the at least one cable deflector being mounted onto the frame;
the at least one cable deflector being positioned adjacent the at least one spool; and
the at least one hoisting cable being operatively coupled to the at least one cable deflector, wherein the at least one cable deflector is used to guide the at least one hoisting cable onto and off the at least one spool.

8. The barbecue cooking apparatus as claimed in claim 7 further comprising:
the plurality of cooking shelves comprising a plurality of racks, at least one catching tray, and at least one fuel-retaining tray;
the at least one fuel-retaining tray being positioned offset from the lid;
the plurality of racks being positioned in between the lid and the at least one fuel-retaining tray; and
the at least one catching tray being positioned in between the plurality of racks and the at least one fuel-retaining tray.

9. The barbecue cooking apparatus as claimed in claim 6 further comprising:
a deadbolt mechanism;
the crank mechanism being a crank handle;
the crank handle being laterally positioned to the frame;
the deadbolt mechanism being integrated into the frame; and
the deadbolt mechanism being positioned adjacent to the crank handle.

10. The barbecue cooking apparatus as claimed in claim 1 further comprising:
the shelved cooking system comprising at least one support member, a plurality of cooking shelves, and a plurality of releasable pin locks;
the at least one support member being connected normal to the lid;
each of the plurality of cooking shelves being attached to the at least one support member by a corresponding lock from the plurality of releasable pin locks;
the plurality of cooking shelves being positioned normal to the at least one support member; and
the plurality of cooking shelves being distributed along the at least one support member.

11. The barbecue cooking apparatus as claimed in claim 10 further comprising:
the at least one intake vent and the at least one exhaust vent each comprising a vent body and a vent hatch;
the vent body comprising a first open end and a second open end;
the first open end being positioned adjacent to the lateral wall;
the second open end being positioned offset from the lateral wall; and
the vent hatch being attached onto the second open end.

12. The barbecue cooking apparatus as claimed in claim 11 further comprising:
the first rail guide and the second rail guide each comprising a guide body and a guide roller;
the guide body being mounted onto the lid;
the guide roller being rotatably mounted to the guide body;
the guide roller of the first rail guide being rollably engaged to the first length-adjustable rail of the frame; and,
the guide roller of the second rail guide being rollably engaged to the second length-adjustable rail of the frame.

13. The barbecue cooking apparatus as claimed in claim 1 further comprising:
the venting system comprising at least one intake vent and at least one exhaust vent;
the at least one intake vent being integrated into the lateral wall; and
the at least one exhaust vent being integrated into the lateral wall, opposite the at least one intake vent.

14. The barbecue cooking apparatus as claimed in claim 1 further comprising:
a drive wheel assembly;
the drive wheel assembly being mounted onto the lateral wall; and
the drive wheel assembly being positioned adjacent to the base.

15. The barbecue cooking apparatus as claimed in claim 1 further comprising:
a first rail guide;
a second rail guide;
the first rail guide and the second rail guide being peripherally connected to the lid;
the first rail guide and the second rail guide being positioned opposite to each other across the lid;
the first rail guide being movably engaged along a first length-adjustable rail of the frame; and
the second rail guide being movably engaged along a second length-adjustable rail of the frame.

16. The barbecue cooking apparatus as claimed in claim 1 further comprising:
a plurality of food-hanging fixtures;
the plurality of food-hanging fixtures being connected to the lid, opposite the winch mechanism; and,
the plurality of food-hanging fixtures being distributed across the lid.

17. The barbecue cooking apparatus as claimed in claim 1 further comprising:
   at least one temperature gauge;
   the at least one temperature gauge being mounted onto the lid, opposite the shelved cooking system; and,
   the at least one temperature gauge being in thermal communication with the barrel.

\* \* \* \* \*